UNITED STATES PATENT OFFICE.

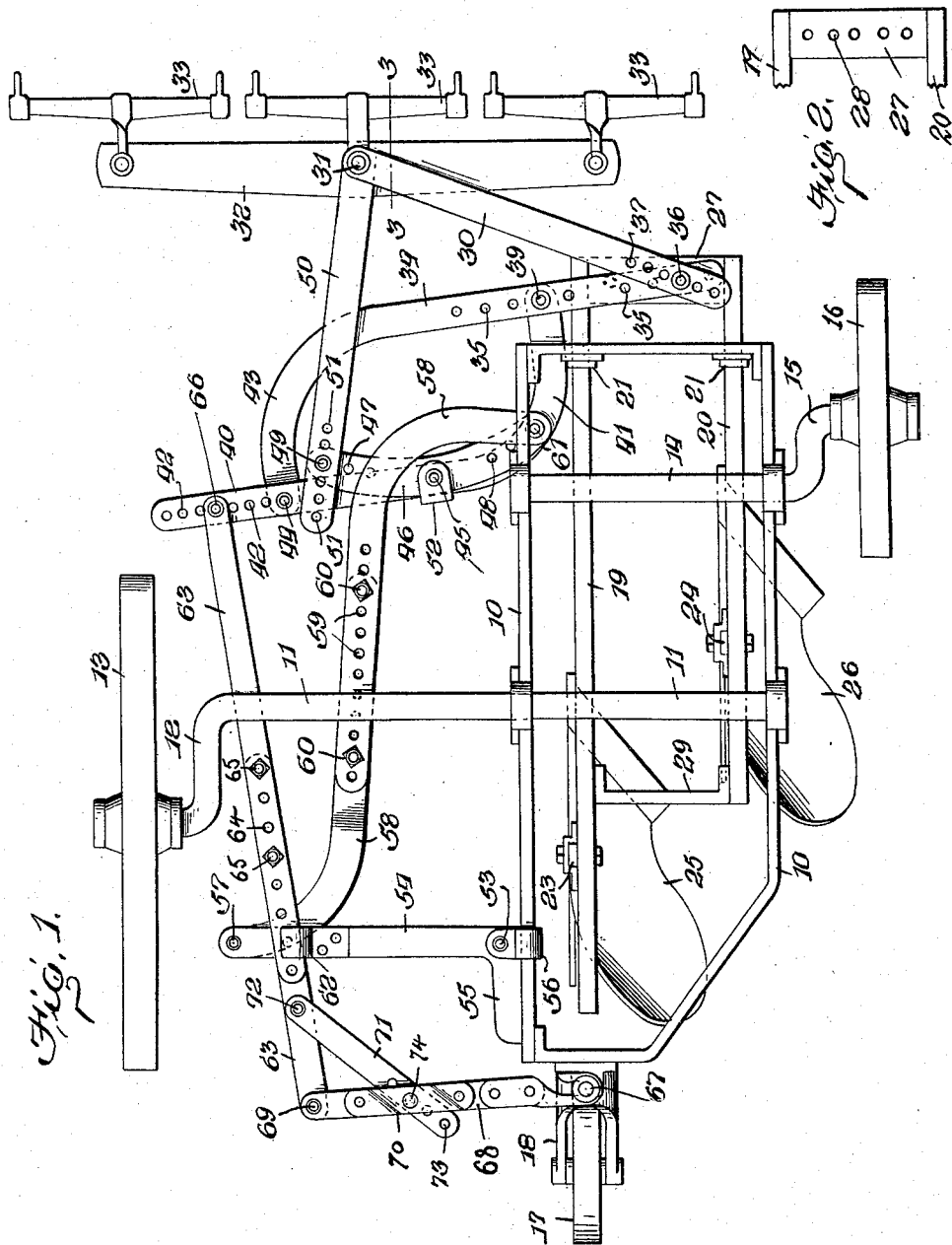

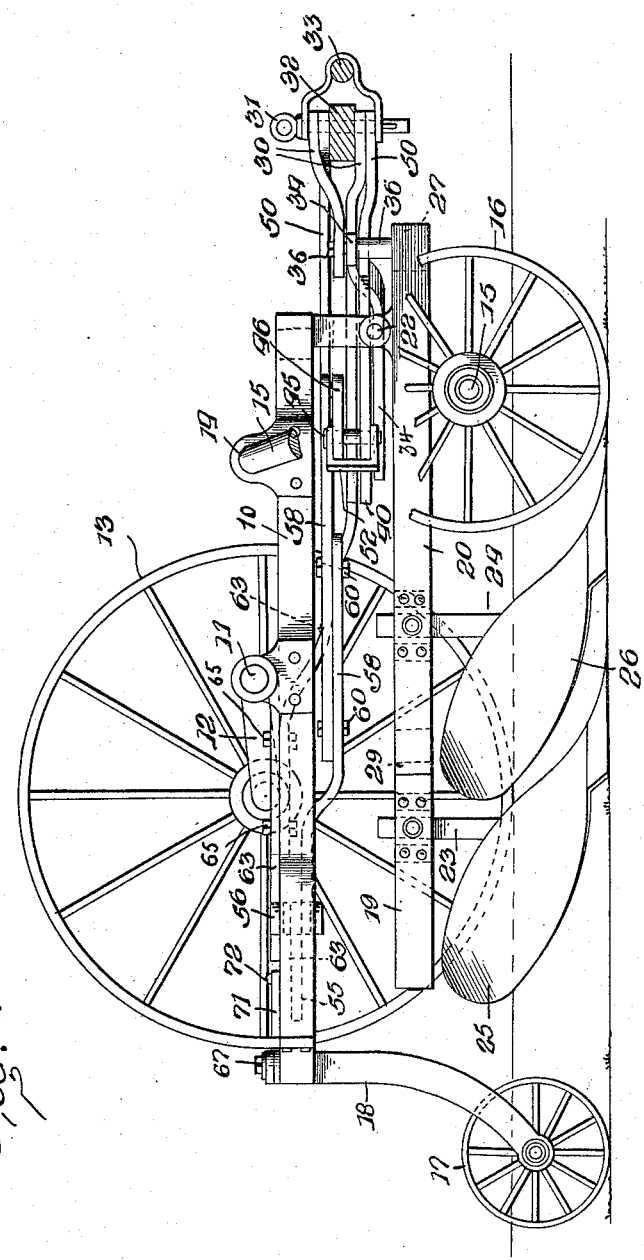

PETER O. KARTRUDE, OF LUVERNE, MINNESOTA.

DRAFT-EQUALIZER.

1,226,975.   Specification of Letters Patent.   Patented May 22, 1917.

Application filed September 18, 1916. Serial No. 120,746.

*To all whom it may concern:*

Be it known that I, PETER O. KARTRUDE, a citizen of the United States, residing at Luverne, in the county of Rock and State of Minnesota, have invented certain new and useful Improvements in Draft-Equalizers, of which the following is a specification.

This invention relates to draft equalizers of the class adapted more particularly to plows, especially gang plows, and has for one of its objects to provide a device of this character whereby side draft is practically eliminated.

Another object of the invention is to provide a device which may be readily adjusted to adapt the device to any required number of horses, and likewise to adapt the device without material structural change to plows of various forms and sizes.

With these and other objects in view the invention consists in certain novel features of construction as hereinafter shown and described and then specifically pointed out in the claims; and in the drawings illustrative of the preferred embodiment of the invention—

Figure 1 is a plan view of a conventional gang plow including the wheel frame and a pair of plows having the beams rigidly coupled, with the improved equalizing devices applied.

Fig. 2 is a detail of the forward part of the plow frame.

Fig. 3 is a side elevation of the parts shown in Fig. 1, with the double tree of the draft appliance in section on the line 3—3 of Fig. 1.

Corresponding and like parts are referred to in the following description and indicated in all the views of the drawings by the same reference characters.

The improved device may be applied without material structural change to riding or sulky plows either of the single or gang form, and it is not desired therefore to limit the invention to any specific construction of plow or its frame, but for the purpose of illustration the improved device is shown applied to a conventional gang plow in which 10 represents the supporting frame, 11 the main axle mounted for rotation upon the frame 10 and having the crank extension 12 carrying the landside wheel 13, the furrow wheel axle 14 mounted for rotation upon the frame and formed with a crank portion 15 carrying the furrow wheel 16, the trailer wheel 17 mounted to swing by the usual frame 18 from the rear of the frame 10. The means for actuating the members 11—14 to change the position of the wheels 13—16 are not shown as they form no part of the present invention.

The plow beams, represented at 19—20, are suspended at their forward ends from the frame 10 by brackets 21, the beams being coupled to swing vertically from the bracket by pivots, one of which is shown at 22.

The beams 19—20 are rigidly coupled at their forward ends by a head plate 27 having a plurality of apertures 28, and coupled at the rear end by a tie member 29. By this means the beams are rigidly coupled and swing upon the pivot 22. The improved equalizing device comprises a bar 30 pivoted at 31 to the double-tree 32 to which swingletrees 33 are coupled in the usual manner. The bar 30 is preferably formed in two sections, one above and one below the double-tree 32, and through both sections of which the pin 31 extends. Disposed at one end between the sections of the member 30 is another bar 34 having a plurality of apertures 35 through one of which a pin 36 extends, and likewise through one of the apertures 28 of the member 27. At its rear end the bar 30 is provided with a plurality of apertures 37 through one of which the coupling pin 36 extends and likewise through one of the apertures 35 of the member 34. By this means the two-part bar 30 and the bar 34 are adjustable relative to each other within the range of the apertures 35 and 37, and likewise adjustable relative to the member 27 within the range of the apertures 35 and 28.

Connected at 39 to the bar 34 is another bar 40 having an elbow at 41 and with a plurality of apertures 42 spaced apart near its outer end. At its outer end the bar 34 is formed with an elbow 43 and connected at 44 in one of the apertures 42 of the bar 40. Pivoted at 45 to the bar 40 is an evener member 46 having a plurality of apertures 47 spaced apart near one end and a plurality of similar apertures 48 spaced apart near the opposite end. Pivoted at 49 in one of the apertures 47 is a bar 50, the latter having a plurality of apertures 51 spaced apart at its rear end with one of which the pivot 49 engages. The bar 50 like the bar 30 is preferably formed in two sections and bears upon opposite sides of the evener member 46 at its rear end and bears upon opposite sides of the doubletree 32 at its forward end and is secured in position by the pivot 31. Both portions of the member 50 are provided with the apertures 51 with one pair of which the pivot 49 engages. The pivot 45 of the evener member 46 is supported and reinforced by a clip device 52, as shown. The pivot 31 serves the three-fold purpose of a means for coupling the bars 30 and 50 and likewise for receiving the coupling of the central swingletree 33. Pivoted at 53 to the frame 10 is a bell-crank member comprising a laterally directed portion 54 and a rearwardly directed portion 55, the latter bearing against the outer face of the frame 10, as shown. By this means, the member 54—55 is free to swing forwardly upon its pivot 53 but is prevented from moving rearwardly by the "toe" like action of the portion 55. The pivot 53 is mounted upon the frame 10 by a suitable clip device 56.

Pivoted at 57 to the arm 54 of the bell-crank member is another bar 58, the latter formed in two parts slidably engaged and provided with apertures 59 to receive clamp bolts 60, so that the bar can be lengthened and shortened. The two part bar 58 extends forwardly and is pivoted at 61 to the evener member 46. The portion 54 of the bell-crank member is provided with a guide bracket 62 with which another bar 63 is slidably engaged. The bar 63 is formed in two parts slidably engaged and provided with apertures 64 and clamp bolts 65 to enable the bar to be lengthened and shortened. The two part bar 63 is pivoted at 66 to the bar 40 by one of the apertures 42. Flexibly connected to the pivot member 67 of the frame 18 of the trailer wheel 17 is an arm 68, to the outer end of which the rear section of the two part bar 63 is pivoted at 69.

Connected to the member 68 is a guide cap 70, and slidable through this cap is a brace 71, the latter pivoted at 72 to the rear section of the two part bar 63. The brace 71 is provided with a plurality of apertures 73 with one of which a breakable pin 74 is engaged, the latter passing through registering apertures in the cap 70 and bar 68.

By this arrangement the members 63 and 68 are rigidly coupled and maintained normally substantially in right-angled relation, and the remaining links, levers and evener members retained in the relative position shown in Fig. 1 subject to the slight changes in position caused by the variations in the resistance of the plows when operated under normal conditions.

The parts are retained in their operative position by the brace 71 so long as the latter remains in the position shown. The pivots 72—74 of the brace thus receive relatively heavy strain, but by forming the pin 74 of breakable material in event of the plows meeting with abnormal resistance, such as a large stone, a stump, tree root, or the like, which would endanger the safety of the parts, the pin 74 will break and release the brace 71 and permit the lever 63—78 to assume a relatively acute angle and the coupled members 34—40 to swing forwardly upon the pivot 36 and thus prevent damage to the other parts. The pin 74 can then be renewed at a trifling expense as it is of wood.

The various bars are of metal and as light as possible consistent with the strains to which they will be subjected, and the various pivotal joints are sufficiently loose to permit free play between the members.

By reference to Fig. 1, it will be noted that only one of the horses when attached to the swingletrees 33 travels in the furrow, while all the other horses move upon the unplowed land, or so that none of the horses move on the plowed land.

By this arrangement it will be noted that when draft is applied to the double-tree 32 the plow beams will be drawn forwardly together with the coupled frame 10, the wheels 13—16 being adjusted in the usual manner to control the depth of the furrow turned by the plows.

As the teams move forwardly, the members 30—50 will be moved forwardly therewith, the member 30 drawing upon the plow beams while the member 50 exerts a forward pull upon one end of the evener member 46 and likewise communicates forward motion to the member 40 and thence to the member 34. The forward movement of the outer end of the member 46 causes the inner end to move rearwardly and apply a pushing force upon the member 58 and thence to the portion 54 of the bell-crank member and cause the "toe" portion 55 of the same to exert a corresponding lateral force against the frame 10 and thus exert a corresponding lateral force against the landside portions of the plows and away from the unplowed land or away from the landside. As before stated, the forward strain applied to the double-tree 32 exerts a forward force against the members 40 and 34, and this forward movement is communicated to the member 63 and to the arm 68 and to the pivot 67 of the trailer wheel frame 18 and produces a pulling force at the rear toward the landside. By this means the lateral strain is equalized and the plows caused to move forwardly without appreciable side draft. By adjusting the various pivots in the various apertures, the extent of the lateral pressure both toward and away from the landside can be controlled, and likewise by adjusting the various pivots in the same manner the "leverage" between the parts can be adjusted to suit the conditions of the soil and the construction of the plow to which the device is applied. The horses are thus caused to move uniformly and exert a uniform force upon the draft mechanism.

Having thus described the invention, what is claimed as new is:

1. The combination with an equalizing appliance, of means adapted to couple said equalizing appliance to the forward portion of a structure to be drawn and exerting a lateral force thereto in one direction, and means adapted to couple said equalizing appliance to the rear portion of the structure to be drawn and exerting a lateral force thereto in the opposite direction.

2. The combination with a plow including a supporting frame, of an equalizing appliance including a lever device swinging at one end from the plow frame at the forward end thereof, an arm extending from the plow frame near its rear part and pivoted to swing in one direction relative thereto, an evener member carried by said lever device, means for coupling said evener member at one end to said arm, means for coupling said evener member at the other end to a draft appliance, means for coupling said draft appliance to said plow frame at its forward end, and means for coupling said lever device to the plow frame at its rear end.

3. The combination with a plow including a supporting frame and a trailer wheel and its frame, of an equalizing appliance including a bar adapted to be coupled to the supporting frame at its forward end and to which a drawing force is adapted to be applied, a lever device pivoted at one end to said supporting frame, an evener device pivoted intermediate its ends to said lever device, means for coupling said evener device at one end to said bar, means adapted to couple said evener device at the other end to the supporting frame at its rear portion, and means adapted to couple the lever device to the trailer wheel frame.

4. The combination with a plow including a supporting frame and a trailer wheel and its frame, of an equalizing appliance including a bar adapted to be coupled to the supporting frame at its forward portion and to which the drawing force is adapted to be applied, a lever device formed of coacting members having laterally directed terminals and adjustably coupled to each other by the same, an evener device pivoted intermediate its ends to one of said coacting members, means for coupling said evener device at one end to said bar, means for coupling said evener device at the other end to the plow frame near its rear portion, and means for coupling the lever device to the trailer wheel frame.

5. The combination with a structure to be drawn, including a trailer wheel and its frame, of an equalizing appliance, including a bar connected to the structure and adapted to be coupled to a drawing force, a lever device formed of coacting members adjustably coupled and pivotally united to the structure, an evener device pivoted to one of said coacting members, an arm swinging from said structure and having a rearwardly directed portion bearing against the same and limiting the movement in one direction, connecting means between said arm and said evener device at one end, connecting means between said draft bar and said evener device at the other end, and connecting means between said trailer wheel frame and said lever device.

6. The combination with a structure to be drawn including a trailer wheel and its frame, of an equalizing appliance, including a bar connected to the structure and adapted to be coupled to a drawing force, a lever device formed of coacting members adjustably coupled and pivotally united to the structure, an evener device pivoted at one end to said coacting members, an arm swinging from said structure and having a rearwardly directed portion bearing against the same and limiting the movement in one direction, connecting means between said arm and said evener device at one end, connecting means between said bar and said evener device at the other end, a guide device upon said arm, a bar pivoted at one end to one of said coacting members and slidable at the other end through said guide device, another bar pivoted at one end to said pivoted bar and connected at the other end to said trailer wheel frame, and a member having breakable connection with said last mentioned bars.

7. In combination with a structure to be drawn, of a bell-crank pivoted to the structure with one arm extending laterally and the other arm projecting longitudinally of the structure and bearing against the same rearwardly of said pivot, a lever device swinging from the structure, an evener device pivoted intermediate its ends on the lever device and adapted to have a pulling force applied thereto at one end, and connecting means between the other end of the evener member and the laterally extending arm of the bell-crank.

8. In combination with a structure to be drawn, of a bell-crank pivoted to the structure with one arm extending laterally and the other arm projecting longitudinally of the structure and bearing against the structure rearwardly of the pivot, a lever device swinging from the structure, an evener device pivoted between its ends to the lever device, means for connecting a pulling force to one end of the evener device, means for connecting the other end of the evener device with the laterally extending arm of the bell-crank, and means for connecting the lever device to the structure rearwardly of the bell-crank.

In testimony whereof I affix my signature.

PETER O. KARTRUDE. [L. S.]

Copies of this patent may be obtained for five cents each, by addressing the "Commissioner of Patents, Washington, D. C."